Figure 1:
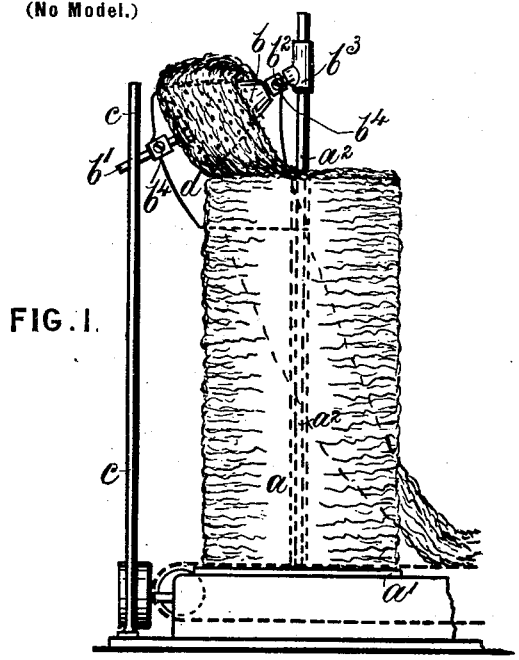

No. 697,459. Patented Apr. 15, 1902.
S. ECROYD & E. E. MARSDEN.
APPARATUS FOR UNBALING RAW COTTON.
(Application filed Aug. 5, 1901.)
(No Model.)

Witnesses
G. M. Richards.
R. W. Bishop.

Inventors
Samuel Ecroyd
Edw. E. Marsden.
by W. H. Babcock
Atty.

THE NORRIS PETERS CO., PHOTO-LITHO., WASHINGTON, D. C.

UNITED STATES PATENT OFFICE.

SAMUEL ECROYD, OF CHORLTON-CUM-HARDY, NEAR MANCHESTER, AND EDWARD ELLIS MARSDEN, OF DIDSBURY, NEAR MANCHESTER, ENGLAND.

APPARATUS FOR UNBALING RAW COTTON.

SPECIFICATION forming part of Letters Patent No. 697,459, dated April 15, 1902.

Application filed August 5, 1901. Serial No. 70,981. (No model.)

*To all whom it may concern:*

Be it known that we, SAMUEL ECROYD, a resident of 100 Oswald road, Chorlton-cum-Hardy, near Manchester, and EDWARD ELLIS MARSDEN, a resident of 38 Bamford road, Didsbury, near Manchester, county of Lancaster, England, subjects of the King of Great Britain and Ireland, have invented certain new and useful Improvements in or Applicable to Apparatus for Unbaling Raw Cotton, (for which we have filed application for British Patent No. 1,332, dated January 21, 1901;) and we do hereby declare the following to be a full, clear, and exact description of the invention, such as will enable others skilled in the art to which it appertains to make and use the same.

This invention relates to improvements in apparatus for the endwise removal of cotton from coiled bales described in the specification of our United States Patent No. 645,167, granted the 13th day of March, 1900, and more particularly relates to that type of apparatus in which the cotton is removed from the bale while rotating about a vertical axis. The drawing-off rollers are described in the said former specification as occupying a fixed position relative to the bottom support of the bale. Hence the interval between the upper end of the bale and the drawing-off rollers continually increases as the work of unbaling proceeds. A continually-augmenting tensional stress owing to the increasing weight of the ascending cotton is thus put on the cotton lifted from the bale on its way to the drawing-off rollers which at times results in the rupture of the cotton. When this happens the attendant must pick up the cotton and again present it to the drawing-off rollers. We have endeavored to overcome this difficulty by the use of supports for the cotton between the end of the bale and the drawing-off rollers. These eliminate the difficulty to some extent; but when using very short-stapled cotton the breakages are still more frequent than is desirable. To insure a continuous action, we according to our present invention use a drawing-off roller so mounted as to descend by gravity in continual contact with or close to the upper end of the bale. Its action can be best described with reference to the accompanying drawings.

Figure 3:
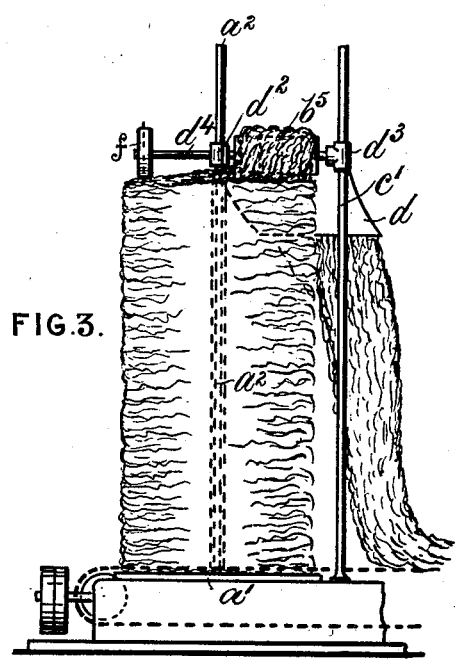
Figure 2:
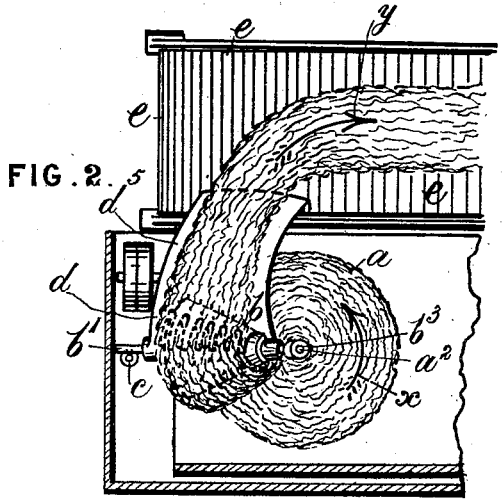
Figure 4:
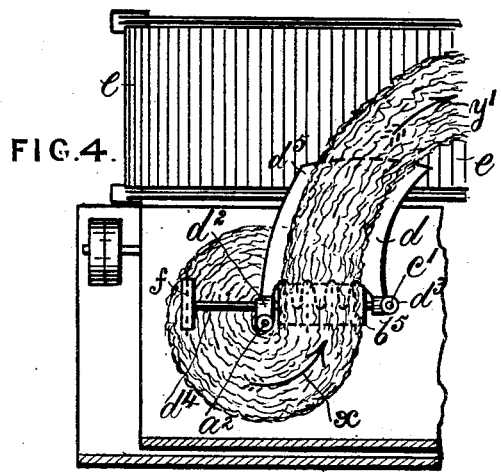
Figure 6:
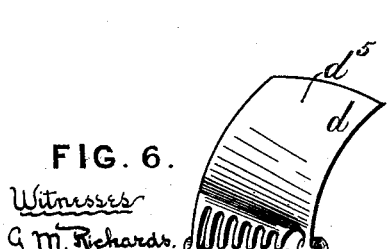
Figure 5:
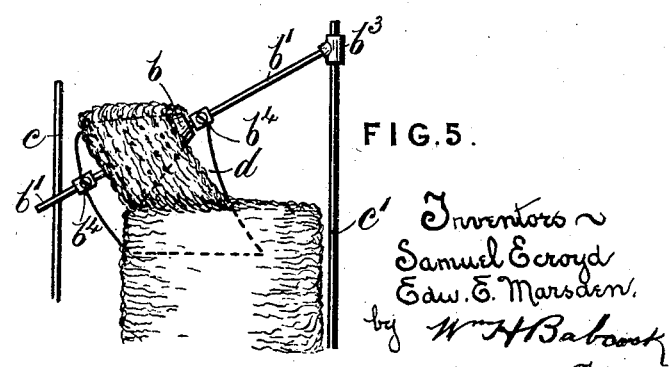

Figure 1 is an elevation of one form of the apparatus with a conical roller. Fig. 2 is a plan thereof. Fig. 3 is an elevation of the apparatus with a cylindrical roller. Fig. 4 is a plan thereof. Fig. 5 is an elevation showing a modified mounting of a conical roller. Fig. 6 is a detached view of the stripping-plate.

Referring first to Figs. 1 and 2, the bale $a$ rests on and rotates with a rotating base-plate $a'$, from which a spindle $a^2$ extends right through the bale. $b$ is a conical roller free to rotate on a rod $b'$, which is connected at $b^2$ to a sleeve $b^3$, free to slide up and down on the spindle $a^2$. The roller $b$ is provided with spikes or pins to take hold of the cotton. The lower end of the conical roller is supported by the top end of the bale, which is assumed for the purpose of description to rotate in the direction of the arrow $x$ of Fig. 2. If the conical roller is let down onto such a rotating bale, it will first be carried bodily around the axis of the bale until the rod $b'$ comes against a vertical stop-rod $c$, when the travel of the roller will cease. The continued rolling contact of the end of the bale will thereupon cause the conical roller $b$ to rotate with a similar surface direction to that of the top face of the bale at the point of contact, and the pins nearest the base will pick up and take with them as they rise some of the cotton. The coherence of the fibers will cause the contiguous parts of the cotton to leave the bale, and the whole of the top layer is thus removed and carried upward and over the roller in the direction of the arrow $y$ of Fig. 2. To strip the lifted cotton clear of the spikes, a curved stripping-plate $d$ is mounted partly over and behind the conical roller. The fore edge of the stripping-plate is serrated or notched, as shown in Fig. 6, so as to form fingers $d'$, which are set sufficiently far apart to pass between the spikes of the rollers at their front ends. The length of the notches is such as to prevent contact between the plate and the spikes of the roller as the latter descend toward the bale. The fingers $d'$ thus lift the cotton off the conical roller, while the extension $d^5$ of the stripping-plate serves as a support and a guide for the cotton on its way to the lattice $e$. The stripping-plate is secured by set-screws $b^4$ to the rod $b'$, so as to descend therewith, and thus always occupy the same relative position to the roller. As the bale shortens the sleeve $b^3$ descends along the spindle $a^2$ by gravity. The roller $b$ is thus kept in continual contact with the upper end of the bale and interruption of the process whether from shortness of staple or breaks of continuity in the coil of cotton is completely prevented.

Fig. 5 shows the method of mounting the roller in the case of solid coiled bales, where the use of a central spindle is inapplicable. In this case the sleeve $b^3$ is mounted on a side spindle $c'$ outside the bale. The action is otherwise as already described.

Figs. 3 and 4 illustrate a modification in which a cylindrical spiked roller $b^5$ is used. In this case the rotation of the roller $b^5$ is not affected by the direct rolling contact of the spiked roller on the face of the cotton. The roller is secured to a shaft $d^4$, which rotates in bearings $d^2$ $d^3$, carried by sleeves sliding on a central spindle $a^2$ and a side spindle $c'$. Secured on the same shaft $d^4$, but on the other side of the center of the bale, is a disk $f$, armed with spikes. The disk $f$ and the spiked cylindrical roller are of such relative diameters that the spiked roller $b^5$ just clears the surface of the cotton, while the whole weight of the shaft bears with the disk $f$ on the end face of the bale. The rolling contact between the end of the bale and the disk $f$ will cause the latter to rotate with a similar surface direction to that of the bale itself at that point. This rotary motion is transmitted by the shaft $d^4$ to the spiked roller $b^5$. Owing, however, to the latter being on the opposite side of the axis of the bale, the spiked roller $b^5$ will have a direction of rotation opposite to that of the conical roller $b$ of Fig. 1, (with reference to the motion of the bale at the working point.) Consequently the spikes of the roller $b^5$ will, as it were, meet the cotton as it approaches. In starting the cotton is first lifted by hand over the roller $b^5$, which will then continue to draw it off the end of the bale and carry it forward in the same direction, as indicated by the arrow $y'$. The stripping-plate $d$ is used as already described.

The longitudinal expansibility of the baled cotton does not affect injuriously the action of our apparatus.

What we claim as our invention, and desire to secure by Letters Patent, is—

1. In a machine of the type herein referred to a drawing-off roller driven by the rolling contact of the bale itself in combination with supports on which it is mounted, said roller being free to descend under the action of gravity as the bale decreases in size substantially as and for the purpose set forth and shown.

2. In an unbaling-machine of the type herein referred to the combination with a drawing-off roller of a stripping-plate, means for securing said roller and plate together and means for mounting and guiding them, although leaving them free to descend by gravity in close proximity to the upper face of the bale substantially as and for the purpose set forth and shown.

In witness whereof we have hereunto set our hands in the presence of two witnesses.

SAMUEL ECROYD.
EDWARD ELLIS MARSDEN.

Witnesses:
JOHN HALL,
ALFRED T. WHITELOW.